US 10,946,526 B2

United States Patent
Chen et al.

(10) Patent No.: US 10,946,526 B2
(45) Date of Patent: Mar. 16, 2021

(54) ROBOT TAPING SYSTEM AND METHOD OF TAPING

(71) Applicant: NANYANG TECHNOLOGICAL UNIVERSITY, Singapore (SG)

(72) Inventors: I-Ming Chen, Singapore (SG); Qilong Yuan, Singapore (SG); Teguh Santoso Lembono, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 15/765,480

(22) PCT Filed: Oct. 5, 2016

(86) PCT No.: PCT/SG2016/050489
§ 371 (c)(1),
(2) Date: Apr. 2, 2018

(87) PCT Pub. No.: WO2017/061952
PCT Pub. Date: Apr. 13, 2017

(65) Prior Publication Data
US 2019/0070732 A1    Mar. 7, 2019

(30) Foreign Application Priority Data
Oct. 5, 2015    (SG) ............. 10201508267V

(51) Int. Cl.
*B25J 9/16*    (2006.01)
*B65H 35/00*    (2006.01)
(Continued)

(52) U.S. Cl.
CPC ............. *B25J 9/1697* (2013.01); *B25J 9/06* (2013.01); *B25J 11/00* (2013.01); *B25J 11/0075* (2013.01);
(Continued)

(58) Field of Classification Search
CPC ... B25J 9/1697; B25J 9/06; B25J 11/00; B25J 11/0075; B29C 73/12; B29C 70/38;
(Continued)

(56) References Cited

U.S. PATENT DOCUMENTS

| 3,654,038 A | 4/1972 | Hottendorf |
| 5,041,179 A | 8/1991 | Shinno et al. |

(Continued)

FOREIGN PATENT DOCUMENTS

| CN | 104841593 A | 8/2015 |
| WO | 2005105441 A1 | 11/2005 |

(Continued)

OTHER PUBLICATIONS

Foreign Correspondence From a Related Counterpart Application, International Search Report and Written Opinion dated Dec. 22, 2016, International Application No. PCT/SG2016/050489 filed Oct. 5, 2016.

(Continued)

*Primary Examiner* — George R Koch

(57) ABSTRACT

A robot taping system for applying a sticky tape onto of an object; the robot taping system comprising:
a scanner to scan the object;
a computer to generate a 3D model of the object from a scan of the object obtained by the scanner, the computer allowing a user to define a selected area and the computer generating a taping path for covering the selected area with the tape;
a programmable robotic arm configured to move along a trajectory corresponding to the taping path;
a taping tool attached to a free end of the robotic arm and comprising
a tape holder rod to support a roll of the tape thereabout and from where the tape is dispensed; and
(Continued)

a taping roller to contact a non-sticky side of the tape and to press the sticky side of a tape onto the selected area during movement of the robotic arm along the trajectory.

9 Claims, 10 Drawing Sheets

(51) Int. Cl.
  *B25J 11/00* (2006.01)
  *B25J 9/06* (2006.01)
  *B29C 73/12* (2006.01)
  *B65H 43/00* (2006.01)

(52) U.S. Cl.
  CPC ......... *B29C 73/12* (2013.01); *B65H 35/0013* (2013.01); *B65H 43/00* (2013.01)

(58) Field of Classification Search
  CPC ... B29C 70/382; B29C 70/384; B29C 70/386; B29C 70/388; B65H 35/0013; B65H 43/00; B65H 43/02; B65H 43/08; B65H 2301/31; B65H 2301/311; B65H 2301/316; B32B 41/00
  See application file for complete search history.

(56) References Cited

U.S. PATENT DOCUMENTS

| | | | |
|---|---|---|---|
| 5,105,601 A | | 4/1992 | Horiguchi et al. |
| 5,175,018 A | | 12/1992 | Lee et al. |
| 2005/0166413 A1* | | 8/2005 | Crampton ............ B25J 11/0075 33/503 |
| 2006/0054272 A1* | | 3/2006 | Panetta ............... B65H 35/0013 156/250 |
| 2009/0154775 A1* | | 6/2009 | Lea ........................ G01B 11/14 382/108 |
| 2014/0027065 A1 | | 1/2014 | McCowin |
| 2016/0102966 A1* | | 4/2016 | Grossnickle .......... B29C 70/382 356/630 |

FOREIGN PATENT DOCUMENTS

| WO | 2014145471 A1 | 9/2014 |
|---|---|---|
| WO | 2015048276 A1 | 4/2015 |
| WO | 2017061952 A1 | 4/2017 |

OTHER PUBLICATIONS

W. Chen and D. Zhao, "Path planning for spray painting robot of workpiece surfaces," Mathematical Problems in Engineering, vol. 2013, 2013.

S. Izadi, D. Kim, O. Hilliges, D. Molyneaux, R. Newcombe, P. Kohli, et al., "KinectFusion: real-time 3D reconstruction and interaction using a moving depth camera," in Proceedings of the 24th annual ACM symposium on User interface software and technology, 2011, pp. 559-568.

R. A. Newcombe, A. J. Davison, S. Izadi, P. Kohli, O. Hilliges, J. Shotton, et al., "KinectFusion: Real-time dense surface mapping and tracking," in Mixed and augmented reality (ISMAR), 2011 10th IEEE international symposium on, 2011, pp. 127-136.

R. Murray, Z. Li, S. Sastry, and S. Sastry, A mathematical introduction to robotic manipulation: CRC, 1994.

R. A. Newcombe et al., "KinectFusion: Real-time dense surface mapping and tracking," 2011 10th IEEE International Symposium on Mixed and Augmented Reality, Basel, 2011, pp. 127-136.

Murray, Richard M., et al. "A Mathematical Introduction to Robotic Manipulation", CRC Press, Inc. 1994.

Izadi, Shahram, et al. "KinectFusion: real-time 3D reconstruction and interaction using a moving depth camera", UIST 11 Proceedings of the 24th annual ACM symposium on User interface software and technology, pp. 559-568, 2011.

Chen, Wei, et al. "Path Planning for Spray Painting Robot of Workpiece Surfaces", Mathematical Problems in Engineering, vol. 2013, Article ID 659457.

Q. Yuan and I. Chen, "Localization and velocity tracking of human via 3 IMU sensors," Sensors and Actuators A: Physical, vol. 212, pp. 25-33, 2014.

Foreign Communication from a Related Counterpart Application, Office Action dated Mar. 18, 2019, China Application No. 201680058282.8.

Foreign Communication from a Related Counterpart Application, Chinese Office Action dated Oct. 8, 2019, Chinese Application No. 2016800582828 filed on Oct. 5, 2016.

Foreign Communication from a Related Counterpart Application, Chinese Office Action, dated Aug. 24, 2020, Chinese Application No. 20160058282.8 filed on Oct. 5, 2016.

Yuan, Q., et al., "Automatic Robot Taping: Auto-Path Planning and Manipulation", 2015 IEEE 7th International Conference on CIS & RAM, p. 175-180, 978-1-4673-7338-8/15.

* cited by examiner

ROBOT TAPING SYSTEM AND METHOD OF TAPING

CROSS-REFERENCE TO RELATED APPLICATIONS

The present application is a filing under 35 U.S.C. 371 as the National Stage of International Application No. PCT/SG2016/050489, filed Oct. 5, 2016, entitled "ROBOT TAPING SYSTEM AND METHOD OF TAPING," which claims priority to Singapore Application No. SG 10201508267V filed with the Intellectual Property Office of Singapore on Oct. 5, 2015, both of which are incorporated herein by reference in their entirety for all purposes.

FIELD

This invention relates to a robot taping system and a method of taping using the taping robot for taping selected areas of an object with sticky tape.

BACKGROUND

Taping, which is covering the surface of an object using masking tape, is a very important process for many industrial applications such as mechanical parts repairing, surface protection and crack repairing. One example is of aeroplane engine overhaul, where damaged engine parts need to be repaired in a process involving plasma-spraying, where parts of the engine are coated at a high deposition rate. Before the plasma-spraying, other parts of the engine that do not require coating should be covered by tape.

Currently, the taping process depends on manual workers who spend hours masking with tape a single part for repair. In manual taping, the worker sees the geometry of the parts and uses his hand to control the orientation of the tape. At the same time, the worker uses his finger to press and push the tape to make sure that the tape is nicely attached to the surface of the part.

Robot manipulations with 3D scanning models have been investigated in surface treatment applications like spray painting [1] and laser coating removal [2]. These applications are scenarios that does not have contact requirement. Unlike other manipulation behaviour, taping requires special control of the masking tape so that it is oriented correctly. Meanwhile, a pressing force is required to properly attach the masking tape to the correct location without much wrinkle of the tape. This brings difficulty to the taping process.

Taping regular shapes (tubes, bars, etc.) can be easily done using existing standard taping machines [3, 4]. However, if the geometry of the taping parts become complex, the taping problem becomes non-trivial. In particular, taping of a curvature is a more complex task which involves planning a taping strategy, tape orientation control, and taping force control etc. Covering the surface of an object 80 with arbitrary geometry using masking tape 90 is not as simple as other tasks like color painting, spray painting etc. The reason is, in order to cover the area properly with masking tape, taping strategy for surface covering and the taping path to ensure proper tape attachment (preferably without wrinkling of the tape) is important. This requires not only a free path generation of the taping tool 20, but also requires contact between the taping tool 20 and the taping surface of the object 80. While the skilled workers do the manual taping, they firstly plan the strategy to cover the area based on the geometry of the area. For example, they will decide on whether to tape vertically, horizontally, or wrapping around the surface. After the strategy is decided, each tape segment to cover the surface is actually a point to point taping across the surface. In this case, the masking tape needs to be nicely attached to the surface with proper orientation to make sure that the tape goes through the path as expected. Thus, it is not trivial to tell what orientation the tape should exactly start with in order to tape from a given point A to the other given Point B on an arbitrary surface. Also, in order to cover an area of interest with masking tapes, the strategy to cover the surface is not unique. As a result, such taping works to mask curved surfaces are still mainly done manually by skilled workers.

Thus, to minimize human variability and cost in the taping process, it is desirable to provide a taping robot and method of taping that can efficiently mask irregularly shaped parts with tape without depending on the skill of manual workers.

SUMMARY

In the overall process of taping, the taping path should be properly planned in order to let the tape cover the entire area of interest. Therefore, a taping package with proper taping devices and taping path generation strategies that allows a robot manipulator to finish the taping task can be very helpful and of large market potential in industrial manufacturing.

Disclosed is an automatic robotic taping system and corresponding software algorithm taping method to perform surface covering using masking tape. The taping process is a special process which requires correct tape orientation and proper contact to attach the masking tape onto the surface. The automatic system includes a robot manipulator, a rotating platform, a 3D scanner and specific taping end-effectors. Combined with a taping path planning method to cover regions of interest, a taping solution is provided as a useful package for industrial process such as plasma spraying, surface protection etc. The taping solution can be commercialized for robot taping.

According to a first aspect, there is provided a robot taping system for applying a sticky tape having a sticky side and a non-sticky side onto a selected area of a surface of an object; the robot taping system comprising:
  a scanner to scan the object;
  a computer to generate a 3D model of the object from a scan of the object obtained by the scanner, wherein the computer allows a user to define the selected area and wherein the computer generates a taping path for covering the selected area with the tape;
  a programmable robotic arm configured to move along a trajectory corresponding to the taping path;
  a taping tool attached to a free end of the robotic arm, the taping tool comprising
    a tape holder rod to support a roll of the tape thereabout and from where the tape is dispensed; and
    a taping roller to contact the non-sticky side of the tape and to press the sticky side of the tape onto the selected area during movement of the robotic arm along the trajectory, thereby applying the tape onto the selected area of the surface of the object.

The taping roller may be attached to a compliance spring mechanism providing suspension to the taping roller to ensure conforming contact of the taping roller against the object.

The robot taping system may further comprise a tape guiding roller provided between the tape holder rod and the taping roller at the non-sticky side of the tape to smoothly transmit the tape from the tape holder rod to the taping roller.

According to a second aspect, there is provided a method of taping a selected area of a surface of an object with sticky tape using the robot taping system of the first aspect, the method comprising the steps of:
(a) the scanner scanning the object;
(b) the computer generating a 3D model of the object;
(c) a user defining the selected area on the 3D model for corresponding taping on the object;
(d) the computer calibrating relative positions of the object and the robotic arm;
(e) defining taping parameters including speed and tape overlap ratio;
(f) the computer generating a path for the taping tool following the geometry of the surface and determining corresponding trajectories for the robotic arm; and
(g) moving the robotic arm along the generated path while the taping roller presses the sticky side of the tape onto the surface.

Step (e) may include a user deciding on a taping manner for the object, the taping manner selected from a number of taping manners including: vertical taping, horizontal taping, and wrap-around taping.

Step (e) may include a user selecting a start point and an end point for a first segment of the path to be generated in step (f).

Step (e) may include the computer calculating an initial taping orientation based on the start point and the end point selected for the first segment.

Step (e) may include computer numerically calculating a start point and an end point for each of a number of subsequent segments of the path to be generated in step (f).

Step (e) may include the computer calculating a taping orientation for each of the number of subsequent segments based on the start point and the end point numerically calculated by the computer for each of the number of subsequent segments.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
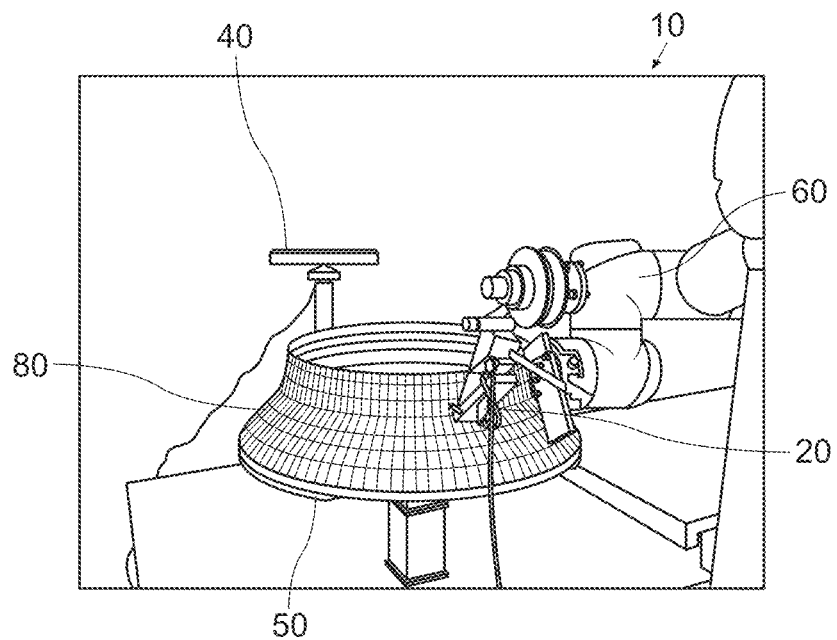
FIG. 1 is photograph of a first exemplary embodiment of a robot taping system.

Exemplary embodiments of a robot taping system 10 and method 100 of taping will be described below with reference to FIGS. 1 to 19. The same reference numerals are used throughout the figures to denote the same or similar parts among the various embodiments.

In the automatic robot taping system 10, in order to realize the robot taping, a specific end-effector or taping tool 20 to properly attach masking tape 90 on the surface of an object 80 is very important. Meanwhile, a motion planning strategy with detailed taping path generation based on a 3D digital model of the object 80 such as a workpiece is crucial [5, 6]. Path planning of the taping process is not trivial because there are many geometric constraints between the object surface 80 and the masking tape 90 during the taping process. Given a workpiece 80, the taping method (including variables such as taping direction: vertical, horizontal, wrapping around taping etc.) needs to be defined. Not only the position but also the orientation of the taping tool 20 needs to be controlled in order to properly attach the tape 90 onto the workpiece surface 80. The pressing force applied on the tape 90 should be in line with the surface normal direction, and the pressing force need to be controlled within a range for proper tape attaching.

Figure 2:
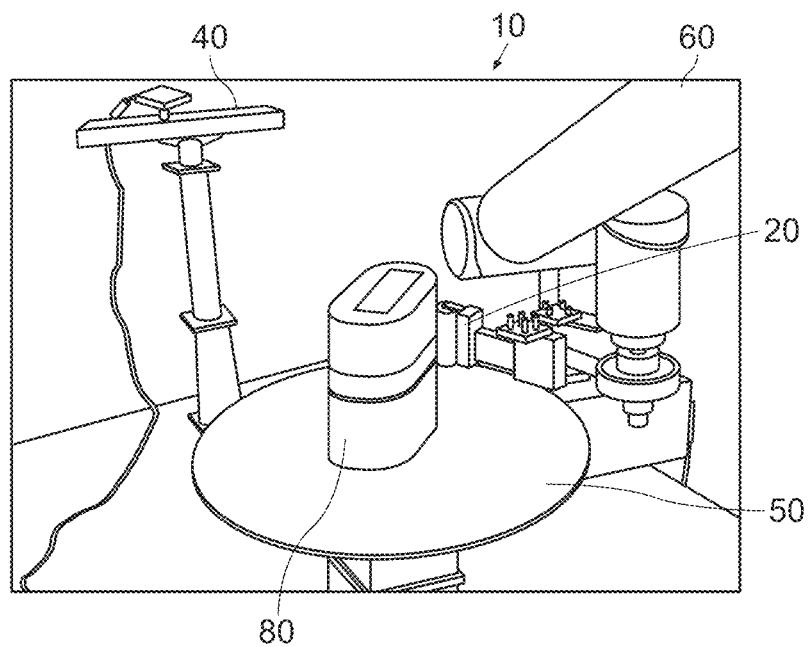
FIG. 2 is photograph of a second exemplary embodiment of the robot taping system.

The following questions need to be answered to make robot taping possible:
1. Given a surface with a certain geometry, how to cover the surface using tapes
2. For each tape segment, how to orient it so that it can be naturally attached onto the surface and goes to the target position.
3. How to compensate the force while taping In a first embodiment of the robot taping system 10 as shown in FIGS. 1 and 2, a taping tool 20 with a taping holding, guiding and attaching mechanism is designed to fulfill the task requirement. A cutting tool 30 is used to separate the taping segments. The system 10 includes a 3D scanner 40 for 3D model reconstruction of the object 80 to be masked with tape, a part-fixing platform 50, and a taping robot 60 to which the taping tool 20 is attached. The taping robot 60 comprises a programmable robotic arm and the taping tool 20 is attached to a free end of the robotic arm. The robotic arm has sufficient degree of freedom to conduct the taping motion. In one example, the taping robot 60 may have seven degrees of freedom similar to that of a human arm.

The part-fixing platform 50 is used to mount the part for taping, i.e., the object 80 to be masked. This platform 50 can either be a simple fixed base or a rotating platform. Alternatively, no platform may be required as the object 80 may be supported by other available appropriate structures such as a laboratory bench top or turntable.

Figure 3:
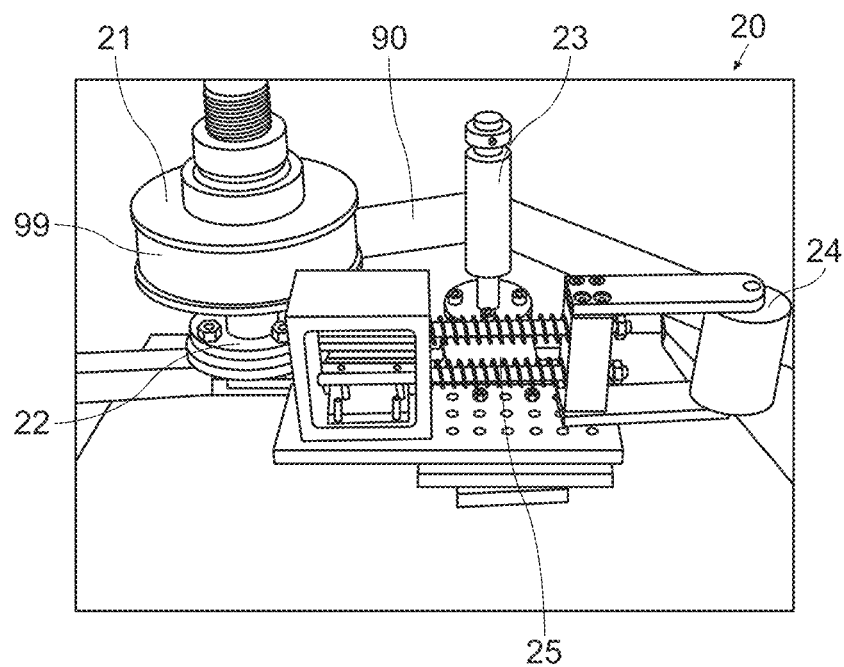
FIG. 3 is a photograph of a first exemplary embodiment of a taping tool of the robot taping system.
Figure 4:
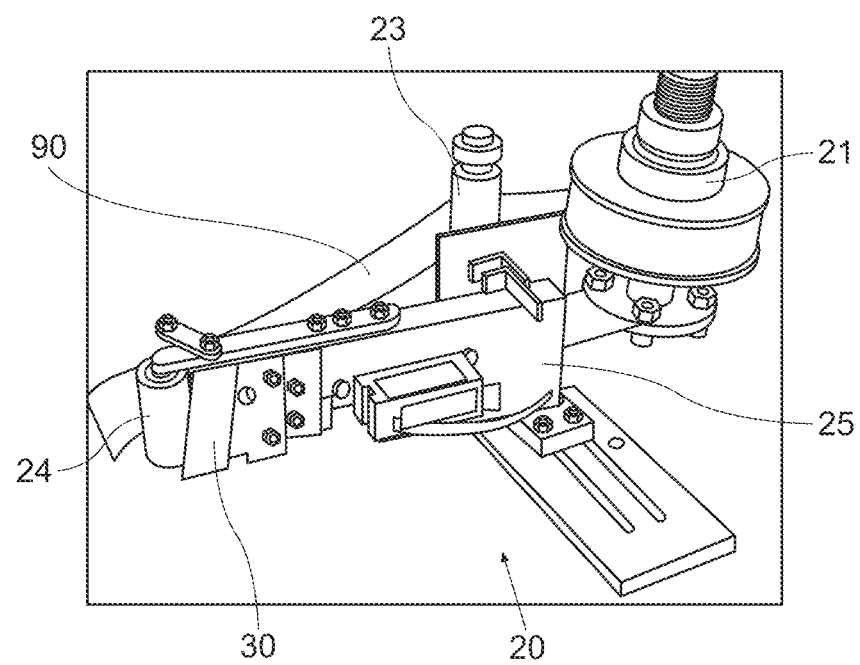
FIG. 4 is a photograph of a second exemplary embodiment of the taping tool of the robot taping system.
Figure 5:
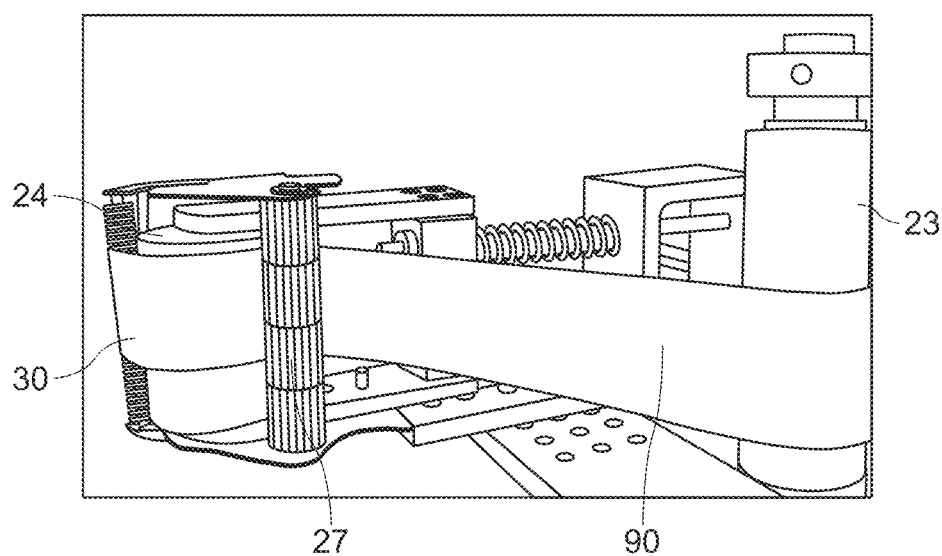
FIG. 5 is a photograph of an exemplary embodiment of a taping holder of the robot taping system.

The taping tool 20 is used as the robot end-effector of the taping robot 60 to handle the tape 90 and conduct the actual taping process. As shown in FIGS. 3 to 5, the taping tool 20 comprises a tape holder 21 in the form of a rod for supporting a roll 99 of the masking tape 90 thereabout and from where the tape 90 is dispensed. The tape 90 has a sticky side and a non-sticky side. The tape holder 21 is attached to the taping robot 60 and may be secured to the taping robot 60 via a fixing flange 22. A taping roller 24 contacts the non-sticky side of the tape 90 to press the sticky side of the tape 90 onto the taping surface of the object 80 as the taping robot 80 is moved along a trajectory according to a generated taping path, as will be described in greater detail below, thereby conducting the tape attachment task. The taping roller 24 is preferably attached to a compliance spring mechanism 25 that allows some tolerance to positioning of taping roller 24. The compliance spring mechanism 25 thus provides suspension to ensure conforming contact of the taping roller 24 against the object 80 being taped, thereby ensuring adherence of the tape 90 onto the object 80 when the tape 90 is provided between the taping roller 24 and the object 80. The tape 90 dispensed from the roll 99 at the tape holder 21 is preferably passed over a tape guiding roller 23 that is provided at the non-sticky side of the tape 90, between the tape holder 21 and the taping roller 24, so that the tape 90 can be transmitted smoothly to the taping roller 24.

In addition, a tape cutter 30 may be provided as the cutting tool 30 to allow separation of the tape segments. The requirements for the tape cutter 30 are firstly to be able to cut the tape 90 properly, and secondly to maintain the tape 90 in the location that is ready for the next taping step. As shown in FIGS. 4 and 5, the tape cutter 30 is provided beside the taping roller 24 in order to be used for tape cutting after the tape 90 has been stuck onto the object 80 by the taping roller 24. A taping holder 27 in the form of a thin roller may be provided adjacent the taping roller 24, between the tape guiding roller 23 and the taping roller 24, so as to form a line contact with the sticky side of the tape in order to stop the tape 90 from going away from the taping roller 24 and to keep the taping roller 24 in contact with the non-sticky side of the tape 90. Rolling axes of the taping roller 24 and the taping holder 27 are preferably parallel to each other.

Figure 6:
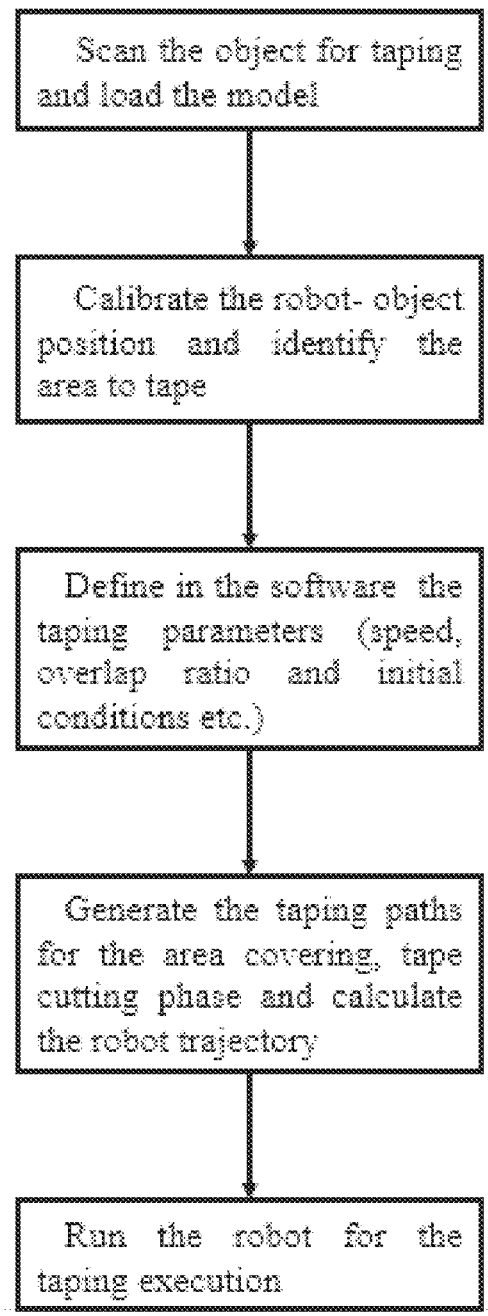
FIG. 6 is a flow chart of a first exemplary taping process using the taping robot system.

Using the robot taping system 10, a first exemplary taping workflow as shown in FIG. 6 may comprise the following steps:
Scanning the object 80 for taping and loading a model of the scanned object 80 into a computer provided with a software configured to generate a taping path and calculate a trajectory of the robot 60
Calibrating relative positions of the robot 20 and the object 80 and identifying areas on the object 80 to tape
Defining in the software taping parameters such as speed, tape overlap ratio and initial conditions and so on
The software generating the taping paths for covering the identified areas to be taped, the tape cutting phase, and calculating the trajectory of the robot 60
Running the robot 60 to execute the taping on the object 80

Figure 7:
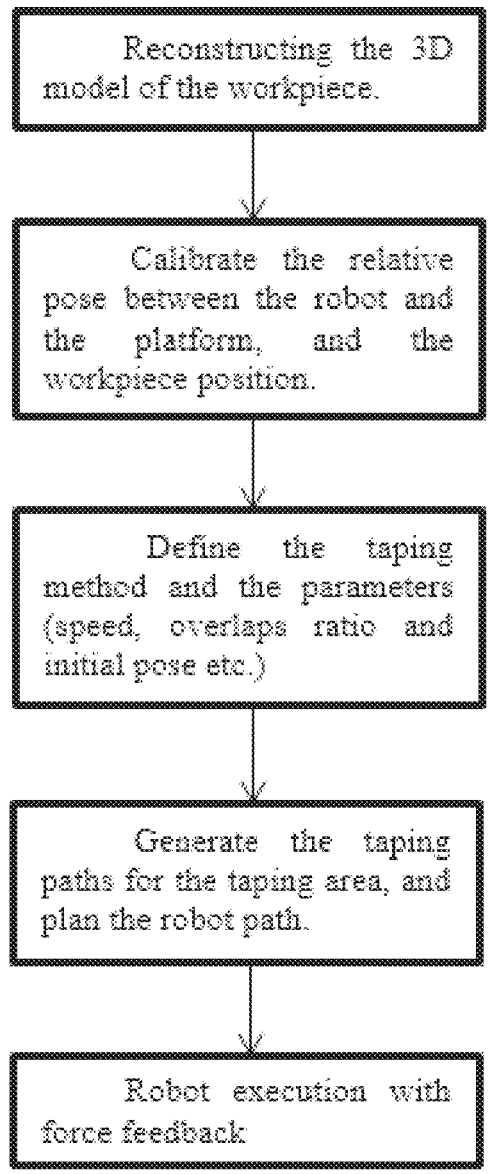
FIG. 7 is a flow chart of a second exemplary taping process using the taping robot system.

A second exemplary taping workflow as shown in FIG. 7 may comprise the following steps:
Reconstructing a 3D model of the workpiece 80 to be masked with tape 90
Calibrating relative pose between the robot 60, the platform 50 and the position of the workpiece 80
Defining a taping method and parameters such as speed, tape overlap ratio and initial pose and so on
Generating a taping path for the taping area and planning a path of the robot 60
The robot taping system 20 executing the taping with force feedback Defining the taping method and parameters may comprise the following steps:
Decide a taping manner for a certain workpiece (for example, whether taping vertically, horizontally or wrapping around).
Select start and end points for each taping segment in the taping paths. (described in greater detail in Section A.1 below)
Determine correct initial taping orientation of the tape segment based on a numerical method. (described in greater detail in Section A.2 below)

Generating a taping path for the taping area and planning a path of the robot 60 may comprise generating a robot end-effector path for each tape segment and determining corresponding robot joint trajectories.

When executing the taping, in between adjacent tape segments, cutter action is preferably enabled to cut the tape after completing taping of each tape segment. Force control can be activated in the robot execution, using the force feedback.

The present taping path planning approach is based on a 3D point cloud model of the object. Numerically, the 3D point cloud model can provide the 3D position of each point and existing software algorithms can be used to calculate the surface normal at that point.

A. Point-to-Point Taping

Figure 8:
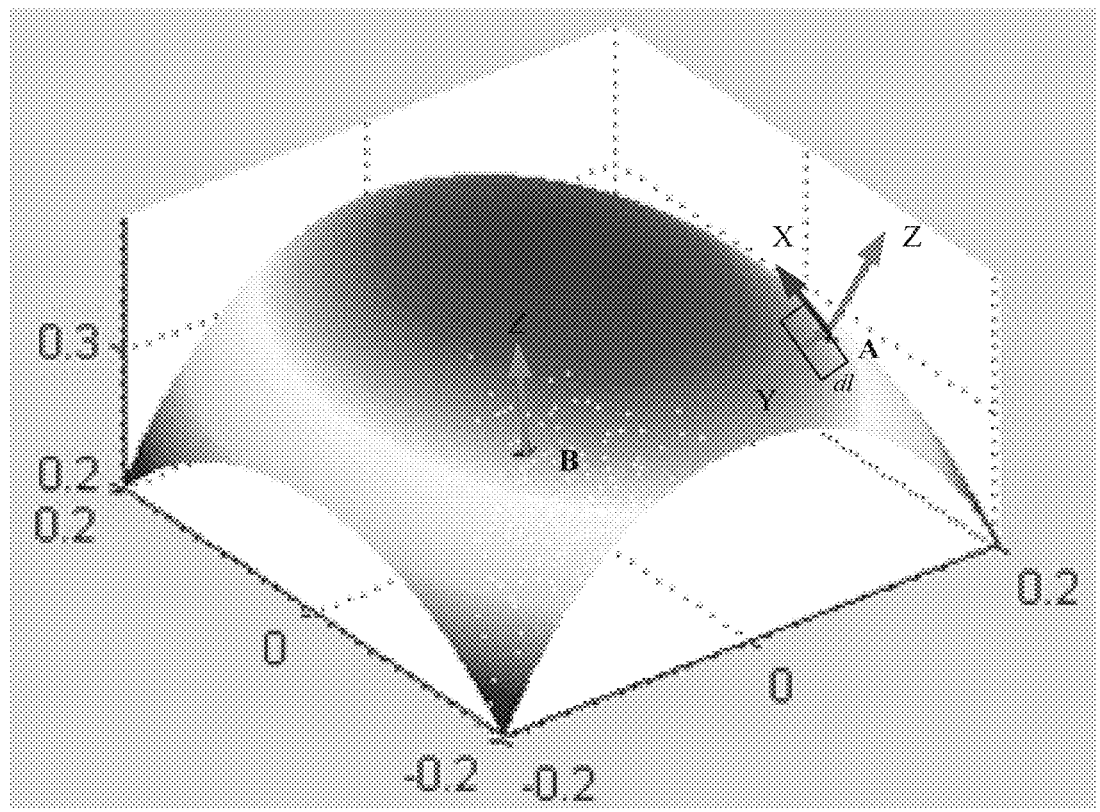
FIG. 8 is an exemplary 3D surface model of an object to be taped.

In point-to-point taping which comprises only a single segment of tape (for example from point A to point B as shown in FIG. 8), the tape is preferably nicely attached to the surface without sudden change of taping orientation (otherwise the tape will wrinkle which is undesirable), and the tape ends at the neighborhood of point B within an error tolerance.

1) Modeling of the Taping Process

In order to analyse a taping path on a surface of an object, a small taping element is used to describe the neighbourhood of a taping point. As shown in FIG. 8, starting from point A, a mini tape element with very small length dl is attached on the surface. At a taping point $p=(x,y,z)$, the taping frame is defined following the orientation of the mini taping element. The Z axis is defined by the surface normal at p. The Y axis is along the taping direction. The X axis is simple $(Y \times Z)$.

Figure 9:
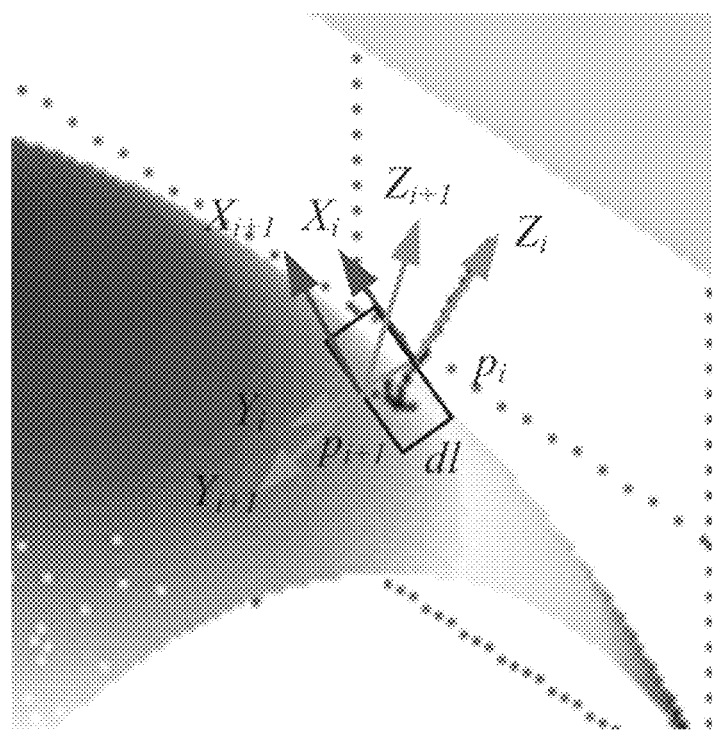
FIG. 9 is an exemplary model of a taping element.

For the mini element, the taping starting point $p_i$ is the middle point of the starting edge of the mini tape element as shown in FIG. 9. The Z axis is defined to be along the normal vector direction.

$$z_i = n_i \qquad (1)$$

Therefore, the next taping point $p_{i+1}$ can be estimated as follows:

$$\hat{p}_{i+1} = p_i + y_i dl \qquad (2)$$

Note that the taping point should lie on the surface. Therefore, a point $\hat{p}_{i+1}$ is projected to the surface to get the next taping point $p_{i+1}$. Numerically, this is to search for the nearest point on the surface to be the next taping point.

Now the critical problem comes while determining the taping orientation of a small taping element. For taping on a flat surface, it is straightforward to know the X axis (and Y axis) of the tape as it does not change while continuously taping on the surface. However, this is not the case for taping on general or irregular surfaces. Therefore, in order to match the tape with the surface nicely, the tape elements need to be properly directed in order to satisfy the geometric constraints of the surface.

Figure 10:
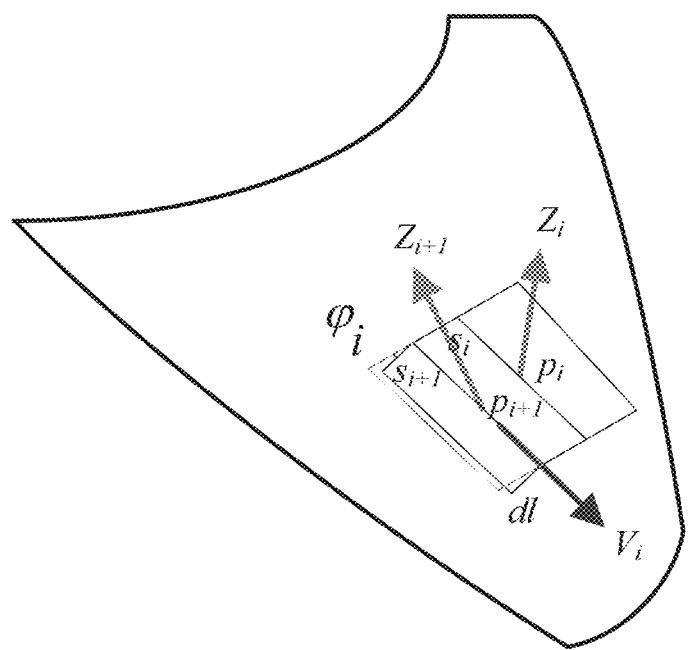
FIG. 10 is an illustration of flipping of the taping element while taping.

As shown in FIG. 10, while the tape attaches to the surface, it is understandable that the tape actually flips to the surface along a certain screw axis which depends on the surface geometry.

In the present exemplary embodiment, width of the masking tape is no more than 2 cm, which is comparably very small. Therefore, it is valid to ignore the deformation (if any) of the tape along the width direction of the tape (actually, the twist line, $V_i$, on the tape is a straight line in many situations, such as when taping a cylindrical surface, conical surface etc.).

In the actual taping, as shown in FIG. 10, the small taping element flips to the surface about a certain axis $V_i$. It is noted that this axis $V_i$ is the intersection between the small taping element surface (flat) $S_i$ and its following small taping element flat surface $S_{i+1}$. As a result, this twist axis $V_i$ is perpendicular to both $z_i$ (the surface normal of $S_i$) and $z_{i+1}$ (the surface normal of $S_{i+1}$).

Therefore, we have, $$V_i = \frac{z_i \times z_{i+1}}{|z_i \times z_{i+1}|}. \quad (3)$$

Geometrically, the body frame of the two taping elements are identical (in orientation) when the tape are straight, the difference actually comes from a twist motion about this twist axis $V_i$ for an angle $\varphi_i$. This angle is therefore the angle between $z_i$ and $z_{i+1}$. Then, we have, $$\varphi_i = a\cos(z_i \cdot z_{i+1}). \quad (4)$$

With such twist motion, it is understandable that the relationship between the orientation $R_i$ of the element frame of $S_i$, and the orientation $R_{i+1}$ of element frame of $S_{i+1}$, are connected by the twisting motion, $$R_{i+1} = e^{\varphi_i \hat{V}_i} R_i. \quad (5)$$

where $\hat{V}_i$ is the skew-symmetric matrix of vector $V_i$. Its corresponding rotation matrix is calculated by the SO(3) matrix $e^{\varphi_i \hat{V}_i}$, details of which can be found in the reference documents [7, 8].

Therefore the taping orientation will be $$y_{i+1} = e^{\varphi_i \hat{V}_i} y_i. \quad (6)$$

In this way, the taping process can be conducted following the geometry of the surface.

2) Initial Taping Orientation

Besides following surface constraints while taping, it is important to figure out the initial taping orientation in order to correctly tape to the target point as expected.

In order to make sure that the tape correctly goes to the target position, we need to find the correct initial taping orientation that leads to the target based on the surface constraints described in the last section.

Figure 11:
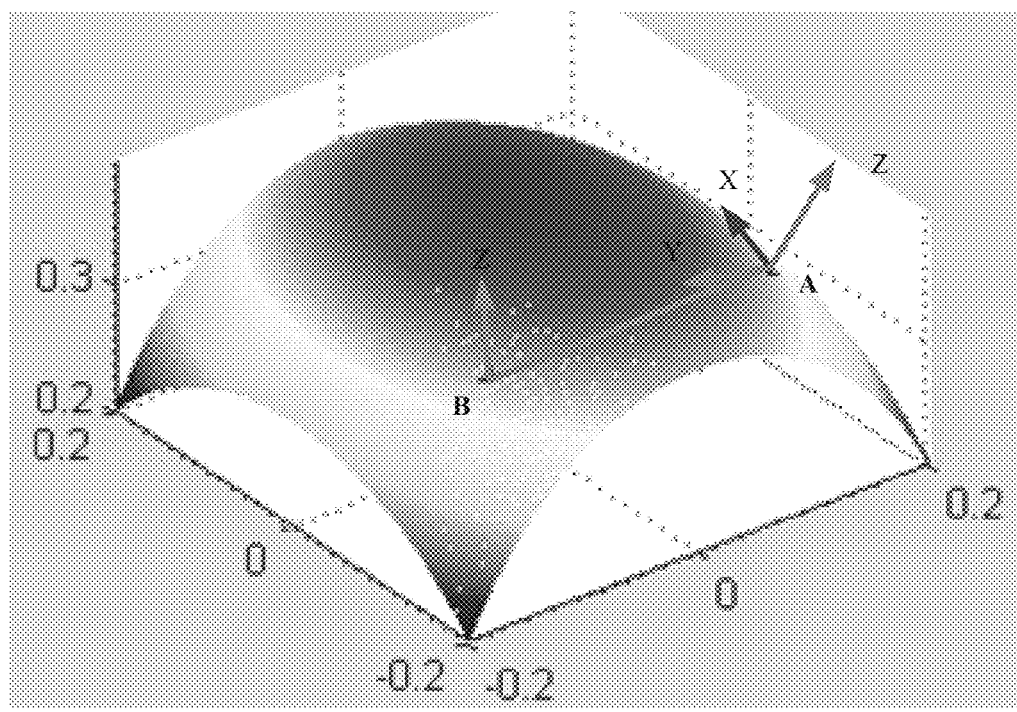
FIG. 11 is a model of a guess of an initial taping orientation.
Figure 12:
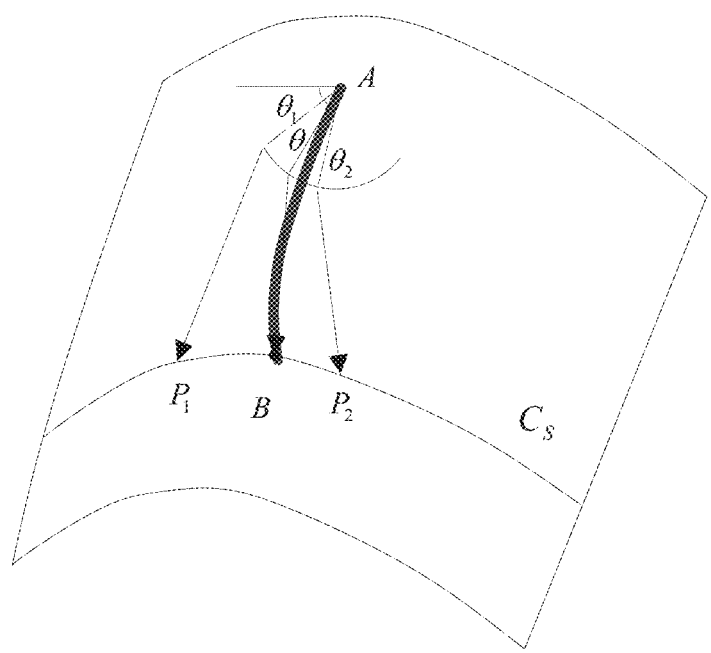
FIG. 12 is an illustration of solving the initial taping orientation.

To calculate the initial taping orientation, in point to point taping, we first need to get an initial guess of the orientation. In the taping scenario on a surface with no significant change in normal vector direction, the initial guess of the taping orientation is made such that it falls into the plane including the $z_0$ and segment AB and and tangential to the surface, the y-axis, as shown in FIG. 11.

$$\hat{y}_0 = \frac{\hat{y}_0}{|\hat{y}_0|} \quad (7)$$

where $\hat{y}_0 = z_0 \times (AB \times z_0)$.

Based on this estimated initial orientation, the taping process is conducted following the taping method described above.

The section curve of the taping surface and the plane S which include point B and perpendicular to AB is denoted by $C_S$. With the starting and ending points A $(x_0, y_0, z_0)$ and B $(x_n, y_n, z_n)$ respectively, the taping process goes until $C_S$, where the ending point for this taping path is P $(x_c = x_n, y_c, z_c)$.

The initial taping orientation solution corresponds to the ending target point B. In the initial guess, the ending point is on one side of B. Through testing on another two orientations, $\theta_2 = \theta_1 + \varphi$ and $\theta_2 = \theta_1 - \varphi$, we can get an ending point that falls on the other side. (Initially, we let $\varphi = 20°$, and $\varphi$ can be enlarged in case all three ending points fall in the same side).

Let function $fs$ be the function mapping the initial angle to the ending point, and $fs(\theta_1) = P_1$ and $fs(\theta_2) = P_2$ where the target ending point is between $P_1$ and $P_2$. The solution of $fs(\theta) = B$ can be found using the Numerical Method (Bisection Method).

For taping of cylindrical surfaces, we can make an initial guess with horizontal direction, and use Newton's Method to get the correct initial taping orientation.

B. Surface Area Taping Strategy

Following the point-to-point taping method described above, a surface taping strategy is introduced to cover a selected area with multiple tape segments.

Figure 13:
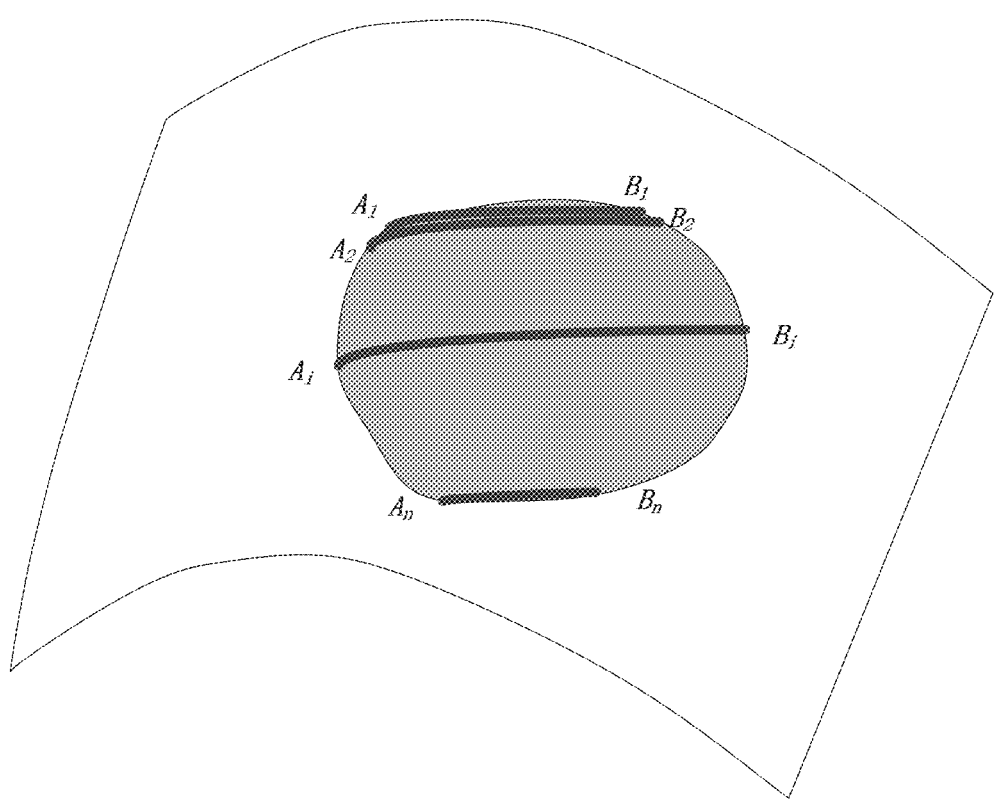
FIG. 13 is an illustration of an exemplary area of interest for taping.

For an area of interest that does not have significant change of the surface normal direction, such as illustrated in FIG. 13, a main taping direction can be selected based on the geometry of the area. This direction can be calculated based on two manually selected points (i.e. start point and end point) on one edge of the area of interest, ($A_i$ and $B_i$ as shown in FIG. 13). Subsequent point pairs of start and end points on the edges of the area of interest to be covered may be numerically calculated to make sure that adjacent tape segments have certain overlapping and are not separated along the taping. The point selection ends when the whole area of interest is covered.

For cylindrical shapes, the taping can be conducted continuously. In this case, only the initial pitch angle is needed to carry out the taping. The initial taping can be calculated based on the method described in the last section.

For an area without significant change of the surface normal direction, and the cylindrical shapes, the above described method works nicely. It is however noted that there may be chances that adjacent tape segment may be separated instead of overlapping if the group of start and end points are not defined properly in the strategy plan, especially when the area has a large variation in the surface normal (such as for a spherical object). For special shapes, pre-knowledge is needed to define the strategy of defining the starting and ending points for taping. However, if such planning does not cover some area due to the large variation of the surface normal, the uncovered area may still be taped in a second stage.

The taping orientation for each of the tape segments may be calculated by the computer from the start and end points for each of the tape segments needed to cover the selected surface.

Taping Execution: Example of Taping Surfaces.

To verify the efficiency of the robot taping system 10 and corresponding methods 100 to perform the taping task, taping of different shapes ranging from a planar surface, cylinder-like surface, free-form surface and rotationally symmetric surfaces were tested and found to be successfully taped using the above described robot taping system 10 and method 100.

Example 1: A Mechanical Part

Figure 14:
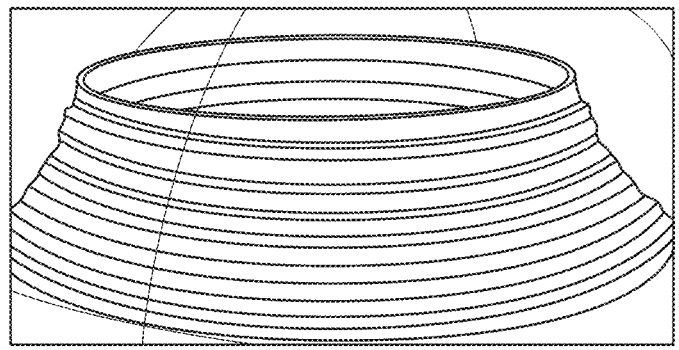
FIG. 14 is a scanned 3D model of a mechanical part to be taped.
Figure 15:
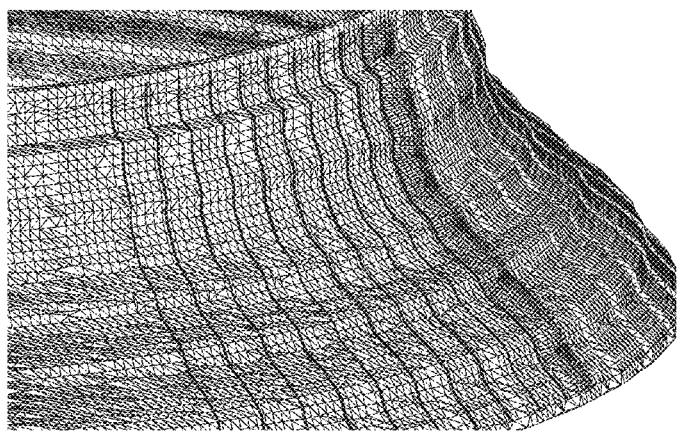
FIG. 15 is a model of taping path planning for the model of FIG. 14.
Figure 16:
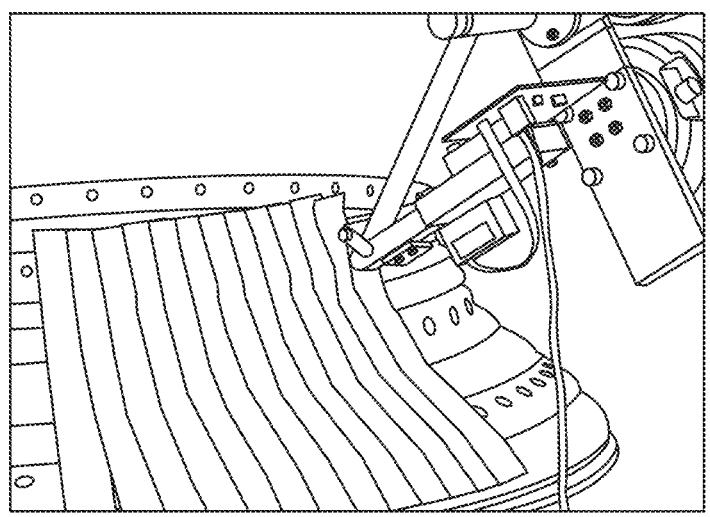
FIG. 16 is a photograph of the robot taping system taping the mechanical part of FIG. 14.

To illustrate the working process of the system 10 and method 100, taping of a mechanical part from an airplane engine was used.
1. 3D modeling. The digital model of the workpiece was scanned using a Kinect scanner. Numerical model was filtered, and the surface normal of each point was calculated. The scanned 3D model was as shown in FIG. 14.
2. Decide the taping method for a workpiece (the taping method was decided by a human user in this example). The user also selected the starting and ending point for the first taping segment using a computer mouse to quickly select the points on the model. The presently disclosed method 100 generated the correct path for taping, as shown in FIG. 15. The other taping segments could be determined based on the tape overlapping on the bottom part of the workpiece.
3. Calculate robot motion based on robot kinematics. The relative position between the robot and the workpiece was calculated ahead, and the cutter action was also generated accordingly in time sequence.
4. Taping Execution. FIG. 16 shows taping result of the automatic robot taping system 10 on the actual workpiece.

Example 2: Freeform Surface

Figure 17:
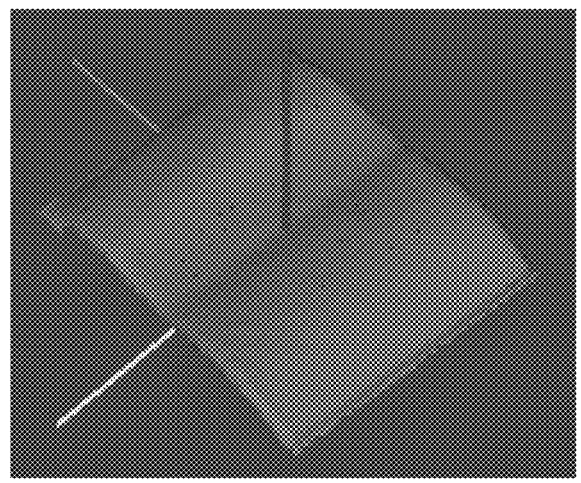
FIG. 17 is a 3D model of a freeform surface.
Figure 18:
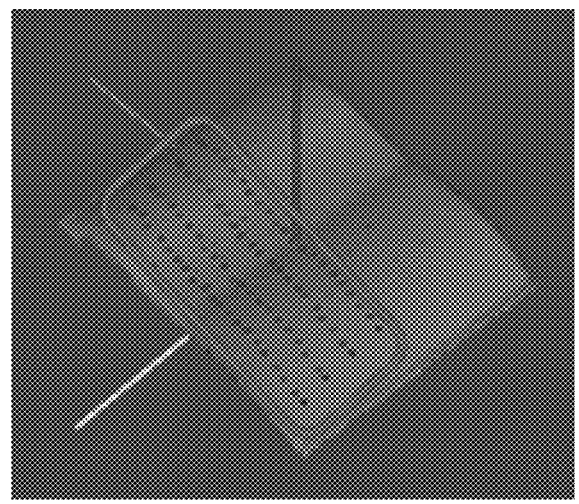
FIG. 18 is the 3D model of FIG. 17 showing a selected part to be taped.

FIG. 17 shows a freeform surface model. FIG. 18 shows a selected part (blue rectangle) of the model of FIG. 17 to be taped. The starting and ending points of each tape segment was selected and the path of the tape was generated.

In cases where adjacent tapes may be separated if starting and ending points are not selected properly, this may be solved by adjusting the starting and ending points, or applying more tapes in between. For 2D free-form surfaces like the model in FIG. 17, only the first segment's starting and ending point need to be specified—the ending points of the remaining segments can be automatically calculated by the method 100 based on the defined overlap of the tapes.

Figure 19:
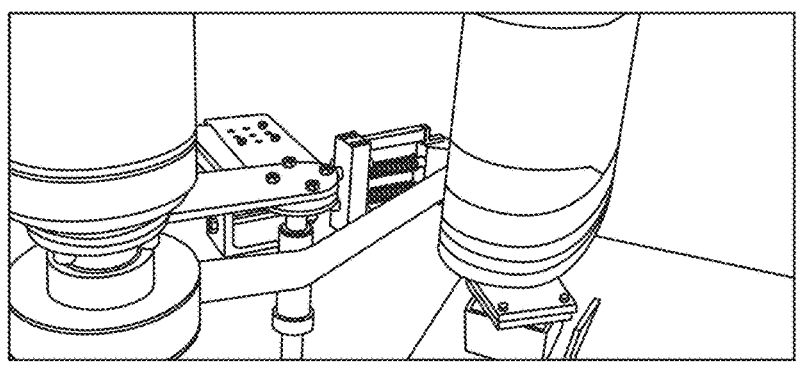
FIG. 19 is a photograph of taping of a cylinder-like surface.

For cylinder-like surface taping, a wrapping around method can be used to cover the surface continuously using one single tape segment, as shown FIG. 19. For such cases, only the pitch angle of the tape needs to be calculated to guarantee correct overlapping of the tape.

The above described robot taping system 10 and method 100 is thus able to mask with tape freeform surfaces, flat surfaces, cylinder-like surfaces and rotationally symmetric surfaces. This covers a major part of workpieces in most practical applications. For more complex surfaces, the object can be separated into several simple components and each component can be taped separately. In the present method 100, the geometric constraints between the masking tape and the surface are mathematically introduced. Based on the described method on taping across the surface from one point to another, the strategy for taping different geometries was disclosed. The path planning ensures that the tape is nicely attached to the surface. Such surface protection solution can be useful in many industrial applications such as spray painting, spot painting, plasma spraying and other related industrial applications such as surface covering before coating of mechanical part for repairing, crack repairing, and surface protection etc.

Whilst there has been described in the foregoing description exemplary embodiments of the present invention, it will be understood by those skilled in the technology concerned that many variations and combination in details of design, construction and/or operation may be made without departing from the present invention.

REFERENCES

[1] W. Chen and D. Zhao, "Path planning for spray painting robot of workpiece surfaces," Mathematical Problems in Engineering, vol. 2013, 2013.
[2] C. L. Baker, C. R. BAKER, D. G. GALATI, J. C. HAINES, H. Herman, A. J. KELLEY, et al., "A supervised autonomous robotic system for complex surface inspection and processing," ed: Google Patents, 2014.
[3] W. J. Hottendorf, "BOX TAPING MACHINE," ed: Google Patents, 1972.
[4] N. Horiguchi, Y. Kaneko, and S. Uda, "Feeder of wrapping paper for coin wrapping machine," ed: Google Patents, 1992.
[5] S. Izadi, D. Kim, O. Hilliges, D. Molyneaux, R. Newcombe, P. Kohli, et al., "KinectFusion: real-time 3D reconstruction and interaction using a moving depth camera," in Proceedings of the 24th annual ACM symposium on User interface software and technology, 2011, pp. 559-568.
[6] R. A. Newcombe, A. J. Davison, S. Izadi, P. Kohli, O. Hilliges, J. Shotton, et al., "KinectFusion: Real-time dense surface mapping and tracking," in Mixed and augmented reality (ISMAR), 2011 10th IEEE international symposium on, 2011, pp. 127-136.
[7] R. Murray, Z. Li, S. Sastry, and S. Sastry, A mathematical introduction to robotic manipulation: CRC, 1994.
[8] Q. Yuan and I. Chen, "Localization and velocity tracking of human via 3 IMU sensors," Sensors and Actuators A: Physical, vol. 212, pp. 25-33, 2014.

The invention claimed is:
1. A robot taping system for applying a sticky tape having a sticky side and a non-sticky side onto a selected area of a surface of an object; the robot taping system comprising:
 a scanner to scan the object;
 a computer to generate a 3D point cloud model of the object from a scan of the object obtained by the scanner, wherein the computer allows a user to define the selected area and wherein the computer generates a taping path following a geometry of the surface based on the generated 3D point cloud model for covering the selected area with the tape;
 a programmable robotic arm configured to move along a trajectory corresponding to the taping path;
 a taping tool attached to a free end of the robotic arm, the taping tool comprising
 a tape holder rod to support a roll of the tape thereabout and from where the tape is dispensed;
 a taping roller to contact the non-sticky side of the tape and to press the sticky side of the tape onto the selected area during movement of the robotic arm along the trajectory, thereby applying the tape onto the selected area of the surface of the object and covering the selected area with the tape, and force feedback provided to control a pressing force applied on the tape to be within a range for proper tape attaching, wherein the pressing force is in line with a surface normal direction.

2. The robot taping system of claim 1, wherein the taping roller is attached to a compliance spring mechanism providing suspension to the taping roller to ensure conforming contact of the taping roller against the object.

3. The robot taping system of claim 1, further comprising a tape guiding roller provided between the tape holder rod and the taping roller at the non-sticky side of the tape to smoothly transmit the tape from the tape holder rod to the taping roller.

4. A method of taping a selected area of a surface of an object with sticky tape using the robot taping system of claim 1, the method comprising the steps of:
 (a) the scanner scanning the object;
 (b) the computer generating the 3D point cloud model of the object;
 (c) the user defining the selected area on the 3D point cloud model for corresponding taping on the object;
 (d) the computer calibrating relative positions of the object and the robotic arm;
 (e) defining taping parameters including speed and tape overlap ratio;
 (f) the computer generating a path for the taping tool following the geometry of the surface and determining corresponding trajectories for the robotic arm;
 (g) moving the robotic arm along the generated path while the taping roller presses the sticky side of the tape onto the surface so as to cover the selected area with the tape; and
 (h) controlling a pressing force to be within a range for proper tape attaching with force feedback, wherein the pressing force is in line with a surface normal direction.

5. The method of claim 4, wherein step (e) includes the user deciding on a taping manner for the object, the taping manner selected from a number of taping manners including: vertical taping, horizontal taping, and wrap-around taping.

6. The method of claim 4, wherein step (e) includes the user selecting a start point and an end point for a first segment of the path to be generated in step (f).

7. The method of claim 6, wherein step (e) includes the computer calculating an initial taping orientation based on the start point and the end point selected for the first segment.

8. The method of claim 6, wherein step (e) includes the computer numerically calculating a start point and an end point for each of a number of subsequent segments of the path to be generated in step (f).

9. The method of claim 8, wherein step (e) includes the computer calculating a taping orientation for each of the number of subsequent segments based on the start point and the end point numerically calculated by the computer for each of the number of subsequent segments.

\* \* \* \* \*